(12) United States Patent
Abramov

(10) Patent No.: US 12,090,780 B2
(45) Date of Patent: Sep. 17, 2024

(54) WHEEL ASSEMBLY

(71) Applicant: D.S RAIDER LTD., Moshav Hagor (IL)

(72) Inventor: Erez Abramov, Moshav Hagor (IL)

(73) Assignee: D.S. RAIDER LTD, Moshav Hagor (IL)

( * ) Notice: Subject to any disclaimer, the term of this patent is extended or adjusted under 35 U.S.C. 154(b) by 693 days.

(21) Appl. No.: 16/982,844

(22) PCT Filed: Mar. 19, 2019

(86) PCT No.: PCT/IL2019/050307
§ 371 (c)(1),
(2) Date: Sep. 21, 2020

(87) PCT Pub. No.: WO2019/180712
PCT Pub. Date: Sep. 26, 2019

(65) Prior Publication Data
US 2021/0053393 A1 Feb. 25, 2021

Related U.S. Application Data

(60) Provisional application No. 62/644,764, filed on Mar. 19, 2018.

(51) Int. Cl.
*B60B 21/02* (2006.01)
*B60B 21/10* (2006.01)

(52) U.S. Cl.
CPC .......... *B60B 21/023* (2013.01); *B60B 21/102* (2013.01); *B60B 21/104* (2013.01)

(58) Field of Classification Search
CPC .... B60B 21/102; B60B 21/104; B60B 21/023
See application file for complete search history.

(56) References Cited

U.S. PATENT DOCUMENTS

| 4,417,766 A | 11/1983 | Smith et al. |
| 5,022,450 A | 6/1991 | Weeks |
| 2008/0070736 A1* | 3/2008 | Yoshino ............... B60K 7/0007 301/6.5 |

FOREIGN PATENT DOCUMENTS

| EP | 0 919 405 A1 | 2/1999 |
| EP | 0919495 A | 6/1999 |

(Continued)

*Primary Examiner* — Scott A Browne
(74) *Attorney, Agent, or Firm* — BROWDY AND NEIMARK, P.L.L.C.

(57) ABSTRACT

The present invention provides a vehicle wheel configured to assemble a motor having an uneven weight distribution. The vehicle wheel comprising a rim having an asymmetric structure. The rim comprising a drop center (202) for mounting a tire, side sections (204A-D) extending axially outward from both sides of the drop center (202), bead bases (208A-D) extending axially outwards from said side sections (204A-D), and flanges (210A-D) disposed axially outward of said bead bases. The bead bases having non symmetrical lengths to compensate the uneven weight distribution of said motor on the rim. The drop center having a drop diameter that is compatible with the diameter of the motor for inserting and encapsulating said motor therein, and the asymmetric structure of the rim compensates the uneven weight distribution of said motor on the rim, thus, maintains said wheel balanced with a minimal overall offset from the center line of the rim.

9 Claims, 4 Drawing Sheets

(56) References Cited

FOREIGN PATENT DOCUMENTS

JP          2676025 B2 * 11/1997
WO        200030871 A1    6/2000

* cited by examiner

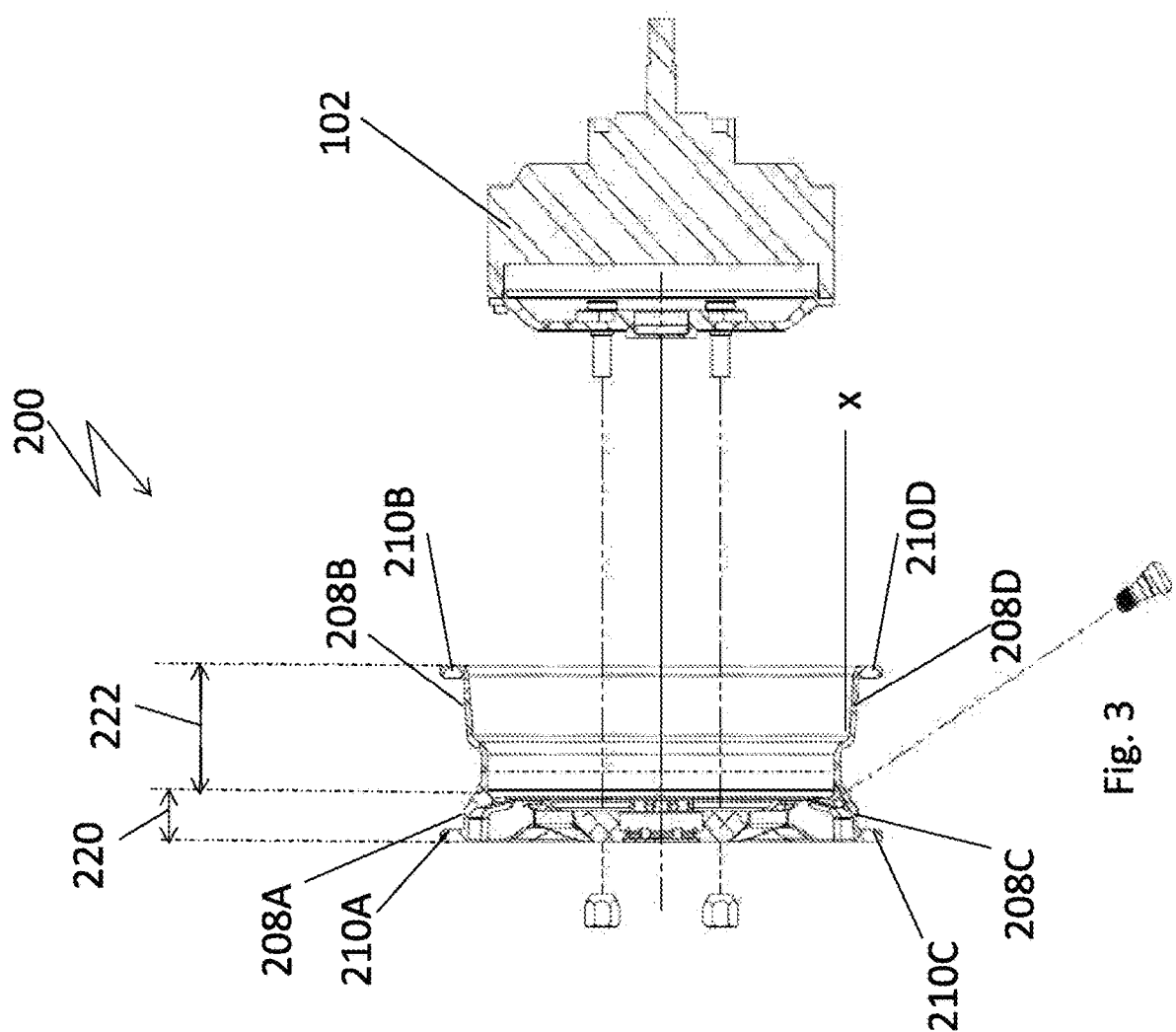

WHEEL ASSEMBLY

FIELD OF THE INVENTION

The present invention generally relates to wheel structures. More specifically, the present invention relates to a rim design structure.

BACKGROUND OF THE INVENTION

Wheels are an integral part of vehicles, and nowadays there are innumerable choices of wheels of various sizes, styles, and materials available in the market. Selection of the right wheel is critical for car safety, and criterion involves price, durability, the endurance of brakes, corrosion resistance, and the endurance during tough driving conditions.

SUMMARY OF THE INVENTION

In accordance with some embodiments of the present invention, there is thus provided a vehicle wheel configured to assemble a motor having an uneven weight distribution. The vehicle wheel comprising:
  a rim having an asymmetric structure, the rim comprising:
  a drop center for mounting a tire,
  side sections extensing axially outward from both sides of the drop center, bead bases extending axially outwards from said side sections, said bead bases having non symmetrical lengths to compensate the uneven weight distribution of said motor on said rim, and
  flanges disposed axially outward of said bead bases,
    wherein said drop center having a drop diameter that is compatible with the diameter of said motor for inserting and encapsulating said motor therein, and
    wherein said asymmetric structure of the rim compensates said uneven weight distribution of said motor on said rim, thus, maintains said wheel balanced with a minimal overall offset from the center line of said rim.

Furtheremore, in accordance with some embodiments of the present invention, the drop center is relatively shallow, and thus, compatible with the diameter of the motor to entail insertion and accommodation of the motor within the rim.

Furtheremore, in accordance with some embodiments of the present invention, the side sections extending upwards at a pre-defined angle, said side sections are asymmetric in length, at least one side section is longer than the other side sections.

Furtheremore, in accordance with some embodiments of the present invention, the at least one side section that is longer than the other side sections comprising an inclined opening and inclined tunnel for situating an air valve therein, thus, for allowing easy access to said air valve.

Furtheremore, in accordance with some embodiments of the present invention, the inclined opening is substantially perpendicular to said at least one side section.

Furtheremore, in accordance with some embodiments of the present invention, the inclined tunnel is substantially perpendicular to the at least one side section.

Furtheremore, in accordance with some embodiments of the present invention, the sidebeads extending upwards at an angle ranging from 2 to 10 degrees.

Furtheremore, in accordance with some embodiments of the present invention, the two of said sidebeads are longer than the other two of said sidebeads.

Furtheremore, in accordance with some embodiments of the present invention, the flanges are substantially vertical to said beadbases securing the tire in place.

BRIEF DESCRIPTION OF THE FIGURES

FIG. 3 illustrates a cross-sectional view of the motorized wheel shield of FIGS. 2A&B in accordance with some embodiments of the present invention.

DETAILED DESCRIPTION OF THE FIGURES

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Figure 1A:
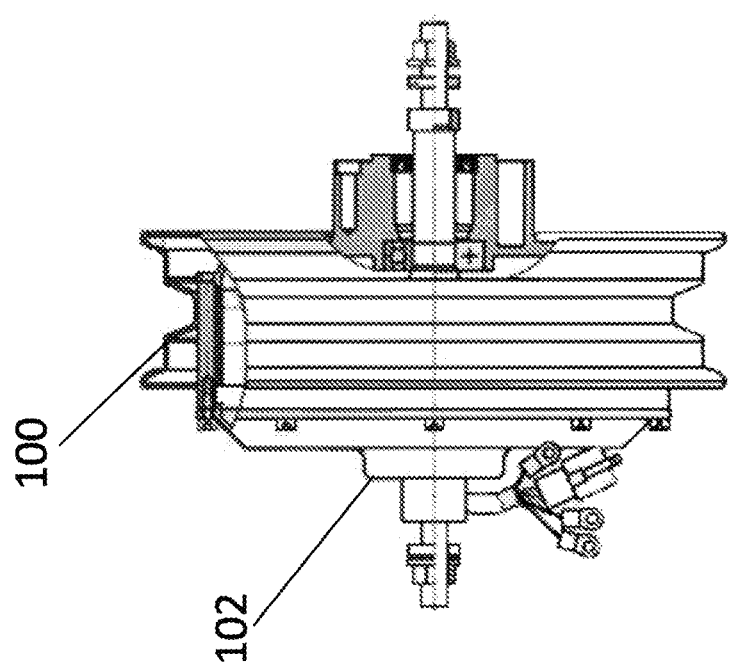
FIGS. 1A&1B (PRIOR ART) illustrate a prior art 10" rim for a vehicle with a motor.
Figure 1B:
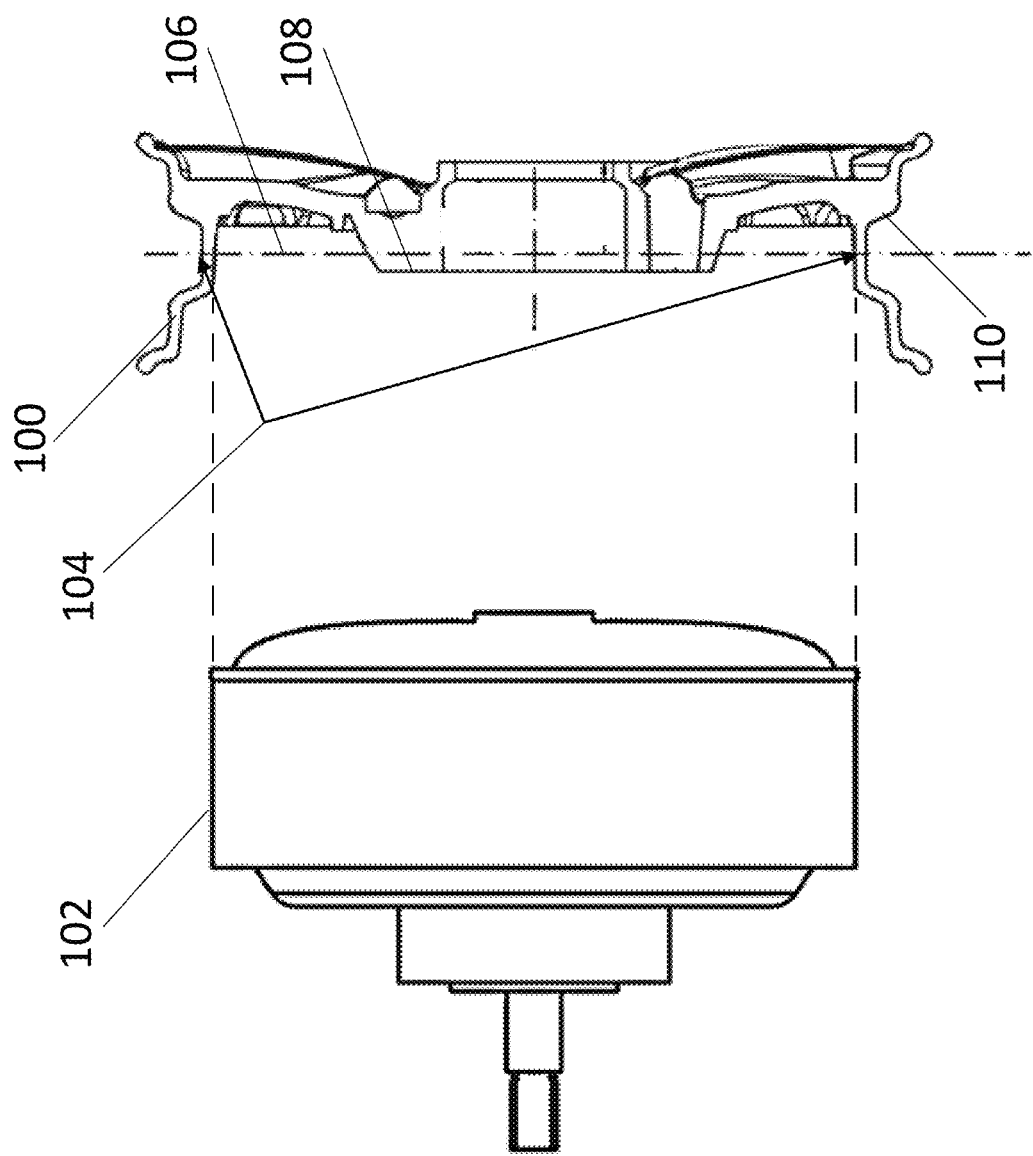

FIGS. 1A&1B (PRIOR ART) illustrate a prior art 10" rim 100 for a vehicle with a motor 102.

As seen in the figures, insertion of motor 102 with it's iron quoit into rim 100 may not be possible due to the limited drop diameter of rim 100 which is not compatible with the diameter of motor 102. Due to such size limitation, the iron quoit of motor 102 and the drop center 104 of rim 100 have to be welded together.

Also, as seen in FIG. 1B, offset 108 of rim 100 is relatively close to center line 106. Due to such asymmetric structure, there is a relatively high offset between the center line 106 and the motor shaft which creates relatively high stresses on the motor shaft.

In addition, the location of the air valve 110 is not easily accessible when motor 102 is encapsulated within encapsulated within rim 104.

Thus, in view of the above, such wheel structure does not possess a design suitable for integrating a motor within the wheel.

Figure 2A:
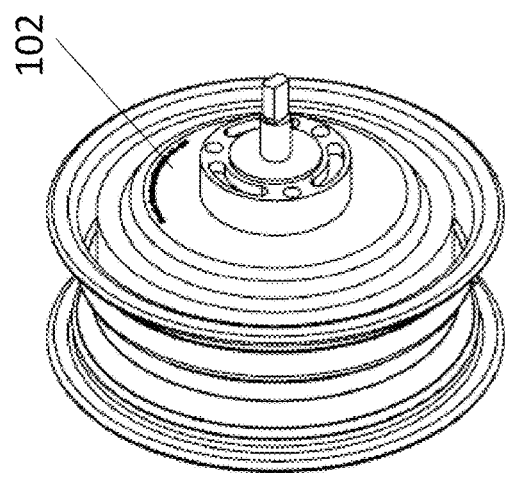
FIGS. 2A&B illustrate a perspective view and cross-sectional view of a motorized wheel shield in an assembled state according to some embodiments of the present invention.

FIGS. 2A&B illustrate a perspective view and cross-sectional view of an asymmetric motorized wheel rim 200 in an assembled state respectively according to some embodiments of the present invention.

In accordance with some embodiments of the present invention, asymmetric rim 200 is configured to assemble a motor having an uneven weight distribution.

Asymmetric rim 200 comprising a relatively shallow drop center 202 for mounting a tire, side sections 204A-D extending axially outward from both sides of the drop center 202 at a predefined angle up to safety humps 206A-D, bead bases 208A-D extending axially outwards from side sections 204A-D, and flared flanges 210A-D disposed axially outward of bead bases 208A-D.

Figure 2B:
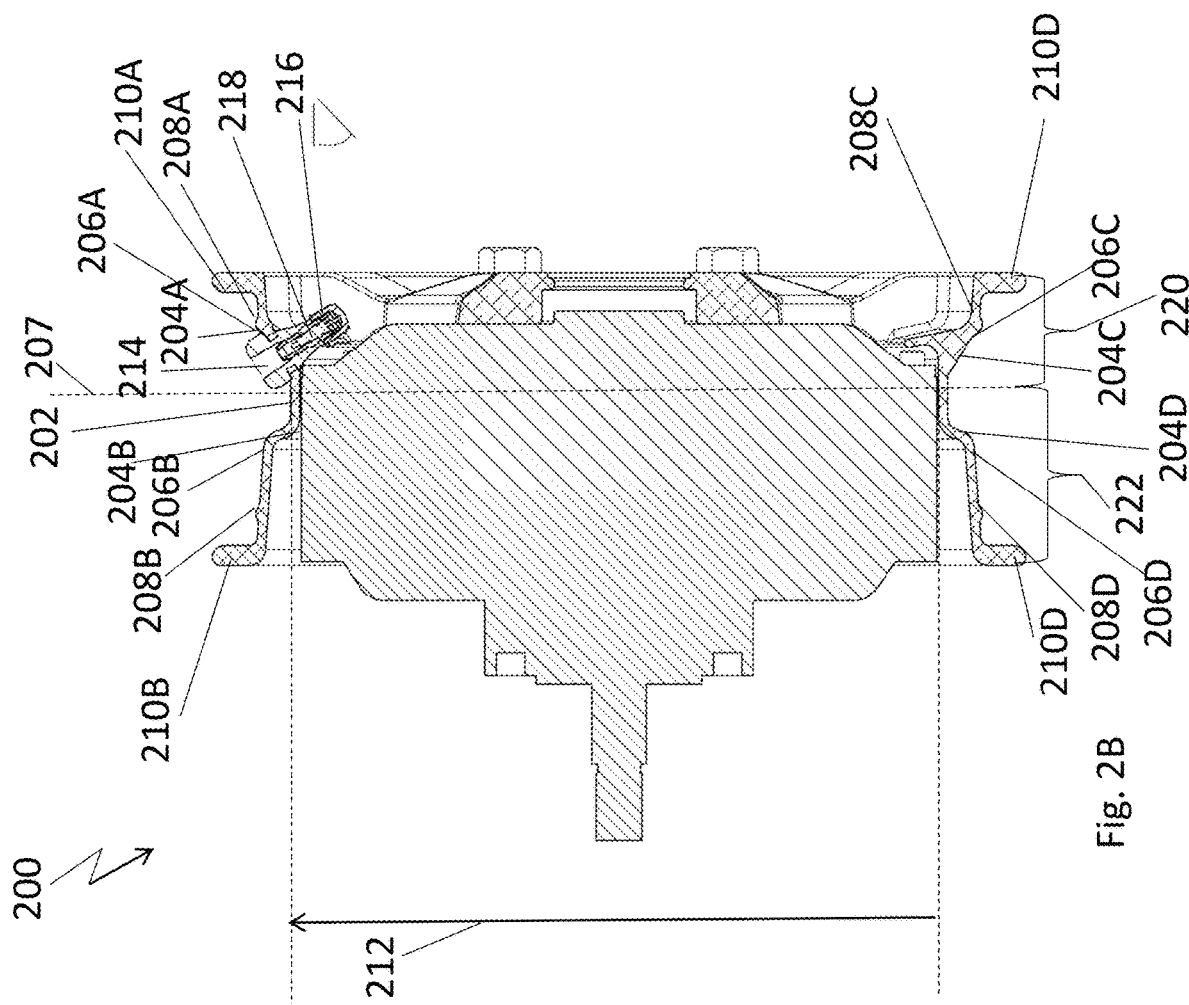

Seen in FIG. 2B, rim 200 is designed to have a relatively shallow drop center 202 with a drop diameter 212 compatible with the diameter of motor 102 to entail insertion and accommodation of the motor 102 within the rim 200.

In accordance with some embodiments of the present invention, bead bases 208A-D have non-symmetrical lengths to compensate the uneven weight distribution of said motor on said rim. As seen in the figures, rim 200 comprises a first section 220 forming a first support structure and a second section 222 which is wider than first section 220 forming a second support structure. The first section 220 and the second section 222 are occupied by electric motor 202 and support the wheel. Thus, in contrast to prior-art wheel designs such as the design shown in FIGS. 1A&B, the structure of motorized wheel rim 200 is asymmetric (line 207 is the centerline of rim 200).

As seen in the figure, side sections 204A-D extend upwards at a pre-defined angle and are asymmetric in length—sides 204A and C are longer than sides 204 B and D.

Such configuration of relatively long inclined side section 204A entails locating opening 214 and tunnel 216 for an air valve 218 outside the area of motor 102. As seen in the figure, opening 214 and tunnel 216 are inclined.

In accordance with some embodiments of the present invention, opening 214 and tunnel 216 are substantially perpendicular to long inclined side section 204A. Such design enables easy access to air valve 218 located outside the area of motor 102 being encapsulated within rim 204.

In accordance with some embodiments of the present invention, such wheel design, i.e., the asymmetric structure of rim 200, allows encapsulating motor 102 within rim 204 with a minimal overall offset from the center line. The asymmetric structure of rim 200 maximizes the space occupied by motor 102 while reducing the loads on the axle of the wheel and on the steering system. Such design keeps the vehicle as light as possible, i.e., eliminating the use of steel for balancing the weights on the wheel while keeping the wheel balanced, while keeping the weight of the combined tire and wheel assembly equalized so that the wheel is balanced and spins smoothly at various speeds.

FIG. 3 illustrates a cross-sectional view of the motorized wheel shield 200 in accordance with some embodiments of the present invention.

A seen in the figure, beadbases 208A-D extend upwards at a pre-defined angle, alpha, with respect to the axial direction X. The angle, alpha, is preferably at least 2° to enable mounting the tire on rim 200 easily and up to about 10° to maintain the holding force of beadbases 208A-D.

As seen in the figure, flared flanges 210A-D are substantially vertical to beadbases 208A-D for securing the tire in place.

It should be noted that unlike the prior art 10" rim 100, illustrated in FIG. 1, that has to be welded to the motor due to size limitation, rim 200 of the present invention is compatible with the diameter of motor 102, and thus, does not have to be welded to it.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A vehicle wheel assembly comprising:
   a motor; and
   a wheel comprising a rim having an asymmetric structure, said rim comprising:
      a drop center for mounting a tire,
      a first section and a second section extending axially outward from both sides of the drop center, the second section configured to receive therein the motor, wherein the second section is wider than the first section, and
      bead bases extending axially outwards from said drop center, said bead bases having non symmetrical lengths to compensate an uneven weight distribution of said motor on said rim,
      wherein said drop center has a drop diameter that is compatible with the diameter of said motor for inserting and encapsulating said motor therein,
      wherein an entirety of a maximum-diameter portion of the motor fits exactly within the rim, resulting in minimal overall offset of the motor from the center line of the rim and reduced loads on the axle of the wheel and on the steering system, and wherein said asymmetric structure of the rim compensates said uneven weight distribution of said motor on said rim;

wherein the motor has symmetrical structure;

wherein the motor and the wheel share the same axle; and wherein the majority of the axial width of the drop center is axially aligned with the maximum outer diameter of the motor.

2. The vehicle wheel assembly of claim 1, wherein said drop center is compatible with the diameter of the motor to entail insertion and accommodation of the motor within the rim.

3. The vehicle wheel assembly of claim 1, further comprising side sections extending upwards at a pre-defined angle, said side sections being asymmetric in length, such that at least one of the side sections is longer than another of the side sections.

4. The vehicle wheel assembly of claim 3, wherein said at least one side section that is longer than the other side section comprises an inclined opening and inclined tunnel for situating an air valve therein, thus, for allowing access to said air valve.

5. The vehicle wheel assembly of claim 4, wherein said inclined opening is substantially perpendicular to said at least one side section.

6. The vehicle wheel assembly of claim 4, wherein said inclined tunnel is substantially perpendicular to said at least one side section.

7. The vehicle wheel assembly of claim 1, wherein said bead bases extend upwards at an angle ranging from 2 to 10 degrees with respect to an axial direction.

8. The vehicle wheel assembly of claim 7, wherein two of said bead bases are longer than another two of said bead bases.

9. The vehicle wheel assembly of claim 1, wherein said rim further comprises flanges, which are substantially vertical to said bead bases, for securing a wheel tire in the rim.

* * * * *